(12) United States Patent
Lu (10) Patent No.: US 12,293,473 B2
(45) Date of Patent: May 6, 2025

(54) INTERACTIVE AUGMENTED REALITY DISPLAY

(71) Applicant: Jiecong Lu, Philadelphia, PA (US)

(72) Inventor: Jiecong Lu, Philadelphia, PA (US)

(73) Assignee: Jiecong Lu, Philadelphia, PA (US)

( * ) Notice: Subject to any disclaimer, the term of this patent is extended or adjusted under 35 U.S.C. 154(b) by 358 days.

(21) Appl. No.: 17/900,208

(22) Filed: Aug. 31, 2022

(65) Prior Publication Data

US 2023/0073282 A1 Mar. 9, 2023

Related U.S. Application Data

(60) Provisional application No. 63/240,396, filed on Sep. 3, 2021.

(51) Int. Cl.
| | |
|---|---|
| *G06T 19/00* | (2011.01) |
| *G06T 17/20* | (2006.01) |
| *G06T 19/20* | (2011.01) |
| *G06V 20/20* | (2022.01) |

(52) U.S. Cl.
CPC ............ *G06T 19/006* (2013.01); *G06T 17/20* (2013.01); *G06T 19/20* (2013.01); *G06V 20/20* (2022.01); *G06T 2219/2012* (2013.01); *G06T 2219/2021* (2013.01)

(58) Field of Classification Search
CPC .................. G06T 19/006; G06T 19/20; G06T 2219/2021; G06V 20/20
See application file for complete search history.

(56) References Cited

U.S. PATENT DOCUMENTS

| | | | | |
|---|---|---|---|---|
| 11,409,402 | B1* | 8/2022 | Cole | G06F 3/04815 |
| 2011/0219339 | A1* | 9/2011 | Densham | G06T 15/00 |
| | | | | 348/46 |
| 2013/0181974 | A1* | 7/2013 | Liu | G09G 5/00 |
| | | | | 345/581 |
| 2020/0004343 | A1* | 1/2020 | Doornenbal | G06F 3/017 |
| 2020/0401212 | A1* | 12/2020 | Devries | G02B 27/0101 |
| 2021/0232719 | A1* | 7/2021 | Ganihar | G06T 17/10 |
| 2022/0068026 | A1* | 3/2022 | Viswanathan | G06F 16/54 |

FOREIGN PATENT DOCUMENTS

CN 116324680 A * 6/2023 ............. G06F 3/011

\* cited by examiner

*Primary Examiner* — Ted W Barnes
(74) *Attorney, Agent, or Firm* — Flaster Greenberg P.C.

(57) ABSTRACT

A mobile device may provide an augmented reality display of a scene. The mobile device may include a camera for capturing a scene comprising one or more objects, a display for displaying an image or video of the scene, a processor, and a memory. The mobile device may display an image of the scene on the display. The mobile device may receive real-time data associated with a mathematical relationship between a plurality of parameters. The mobile device may overlay a three-dimensional plot and an information field over the displayed image. The mobile device may display curvature information on the three-dimensional plot. The mobile device may display a modified three-dimensional plot using updated curvature information and/or a modified input. In response to selection of a point on the three-dimensional plot, the mobile device may display a plurality of vectors extending from the point indicating rate of change information.

18 Claims, 7 Drawing Sheets

INTERACTIVE AUGMENTED REALITY DISPLAY

CROSS-REFERENCE TO RELATED APPLICATIONS

This application claims the benefit of provisional U.S. patent application No. 63/240,396, filed Sep. 3, 2021, the disclosure of which is incorporated herein by reference in its entirety.

BACKGROUND

Augmented-reality devices display one or more augmentation images overlaid on a physical space from a perspective of a user in order to provide an augmented view of the physical space to the user. For example, an augmentation image provides an illusion that a virtual object (e.g., a hologram) is present in the physical space.

The use of mobile devices has increased dramatically in the last decade. Often, such mobile devices include a camera and display for displaying images at which the camera is pointed. Since people usually carry their camera-capable mobile devices with them to a number of settings, it may be desirable to provide additional mobile applications for utilizing the camera and display capabilities of such mobile devices to provide an interactive augmented reality display.

SUMMARY

A mobile device may provide an augmented reality display of a scene. The mobile device may include a camera for capturing a scene comprising one or more objects, a display for displaying an image or video of the scene, a processor, and a memory. The mobile device may display an image of the scene on the display. The mobile device may receive real-time data associated with a mathematical relationship between a plurality of parameters. The mobile device may overlay a three-dimensional plot and an information field over the displayed image. The three-dimensional plot may represent the mathematical relationship. The three-dimensional plot may be derived using a Black-Scholes equation. For example, the three-dimensional plot may simulate the mathematical relationship over time. The information field may be configured to display and/or enable modification of one or more of the plurality of parameters. The mobile device may determine curvature information associated with the three-dimensional plot. The mobile device may display the curvature information on the three-dimensional plot. The mobile device may modify an input of the plurality of parameters in response to a user action. The mobile device may update the curvature information based on the modification to the input. The mobile device may display a modified three-dimensional plot using the updated curvature information and/or the modified input. In response to selection of a point on the three-dimensional plot, the mobile device may display a plurality of vectors extending from the point and may update the information field to display vector information associated with the plurality of vectors. The three-dimensional plot may include a surface mesh with a heat map indicating rate of change information. The mobile device may be configured to change a visualization mode of the three-dimensional plot from a first visualization mode to a second visualization mode. The first visualization mode may be a normal mode in which a value at each point on the three-dimensional plot is mapped to a color spectrum. The second visualization mode may be a curvature mode in which a mean curvature at each point on the three-dimensional plot is mapped to a color spectrum.

The plurality of vectors may indicate rate of change information at the selected point. The curvature information may indicate rate of change information. The mobile device may be configured to display one or more two-dimensional plots that represent projections of the three-dimensional plot at the selected point. Each of the one or more two-dimensional plots may include a vector that corresponds to one of the plurality of vectors.

DETAILED DESCRIPTION

Figure 1:
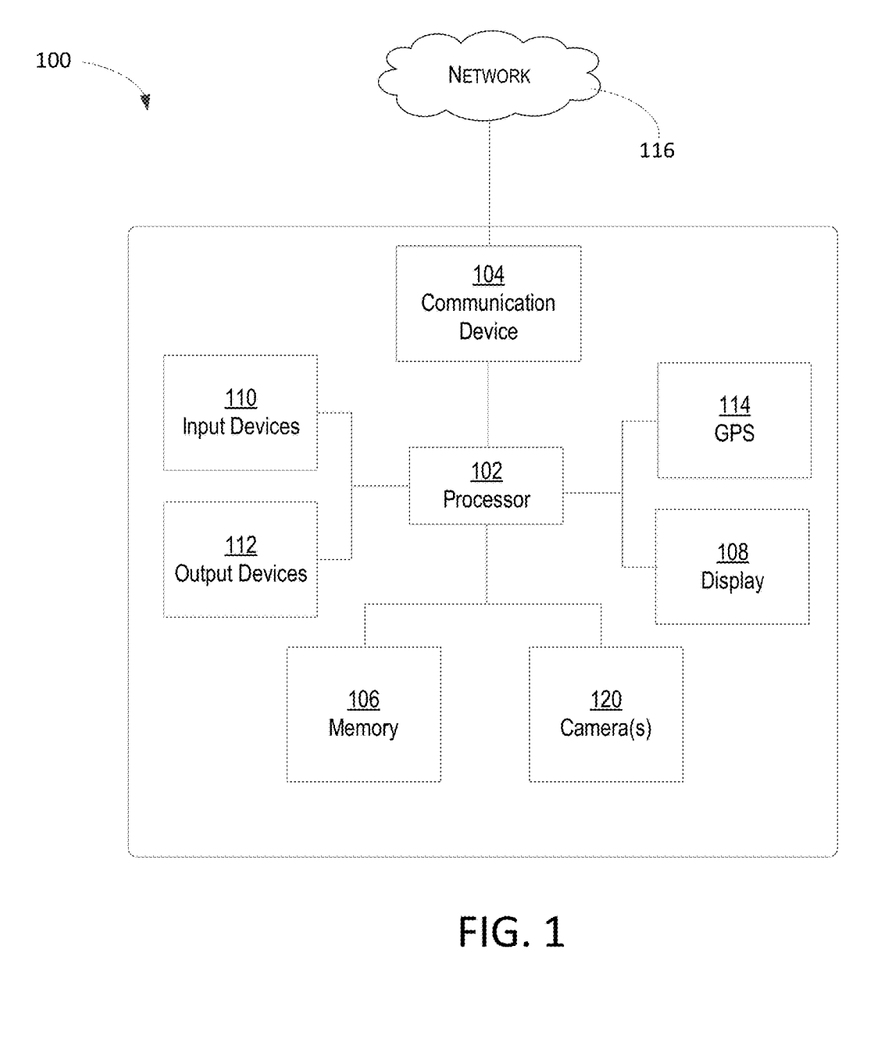
FIG. 1 illustrates a block diagram of an example computing device.

FIG. 1 illustrates a block diagram of an example computing device 100. The computing device 100 may include a personal computer, such as a laptop or desktop computer, a tablet device, a cellular phone or smartphone, an augmented reality headset, a server, or another type of computing device. The computing device 100 may include a processor 102, a communication device 104, a memory 106, a display 108, input devices 110, output devices 112, a GPS circuit 114, and/or one or more cameras 120. The computing device 100 may include additional, different, or fewer components.

The processor 102 may include one or more general purpose processors, special purpose processors, conventional processors, graphics processing units (GPUs), digital signal processors (DSPs), microprocessors, integrated circuits, a programmable logic device (PLD), application specific integrated circuits (ASICs), or the like. The processor 102 may perform signal coding, data processing, image processing, power control, input/output processing, and/or any other functionality that enables the computing device 100 to perform as described herein.

The processor 102 may store information in and/or retrieve information from the memory 106. The memory 106 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory. The memory may be local memory or remote memory external to the computing device 100. The memory 106 may store instructions which are executable by the processor 102. Different information may be stored in different locations in the memory 106.

The processor 102 that may communicate with other devices via the communication device 104. The communication device 104 may transmit and/or receive information over the network 116, which may include one or more other computing devices. The communication device 104 may perform wireless and/or wired communications. The communication device 104 may include a receiver, transmitter, transceiver, or other device capable of performing wireless communications via an antenna. The communication device 104 may be capable of communicating via one or more protocols, such as a cellular communication protocol, a Wi-Fi communication protocol, Bluetooth®, a near field communication (NFC) protocol, an internet protocol, another proprietary protocol, or any other radio frequency (RF) or communications protocol. The computing device 100 may include one or more communication devices 104. For example, the computing device 100 may receive information from the network 116 via the communication device 104.

The processor 102 may be in communication with a display 108 for providing information to a user. The information may be provided via a user interface on the display 108. The information may be provided as an image generated on the display 108. The display 108 and the processor 102 may be in two-way communication, as the display 106 may include a touch-screen device capable of receiving information from a user and providing such information to the processor 102.

The processor 102 may be in communication with a GPS circuit 114 for receiving geospatial information. The processor 102 may be capable of determining the GPS coordinates of the wireless communication device 100 based on the geospatial information received from the GPS circuit 114. The geospatial information may be communicated to one or more other communication devices to identify the location of the computing device 100.

The processor 102 may be in communication with input devices 110 and/or output devices 112. The input devices 110 may include a microphone, a keyboard or other buttons or keys, and/or other types of input devices or sensors for sending information to the processor 102. The display 108 may be a type of input device, as the display 108 may include touch-screen sensor capable of sending information to the processor 102. The output devices 112 may include speakers, indicator lights, or other output devices capable of receiving signals from the processor 102 and providing output from the computing device 100. The display 108 may be a type of output device, as the display 108 may provide images or other visual display of information received from the processor 102.

The camera(s) 120 may record an image of a physical space within a field of view of the computing device 100. For example, the camera(s) 120 may be configured to provide still and video images. The display 108 may display the images captured by the camera(s) 120. The display may be configured to display a live image received by the camera(s) 120. In examples, the camera(s) 120 may include a visible-light camera and/or an infrared camera. The camera(s) 120 may be located on the same side and/or the opposite side of the computing device 100 as the display 108. The camera(s) 120 may be used herein to refer to a group of cameras that are used together by the computing device to capture an image.

Figure 2:
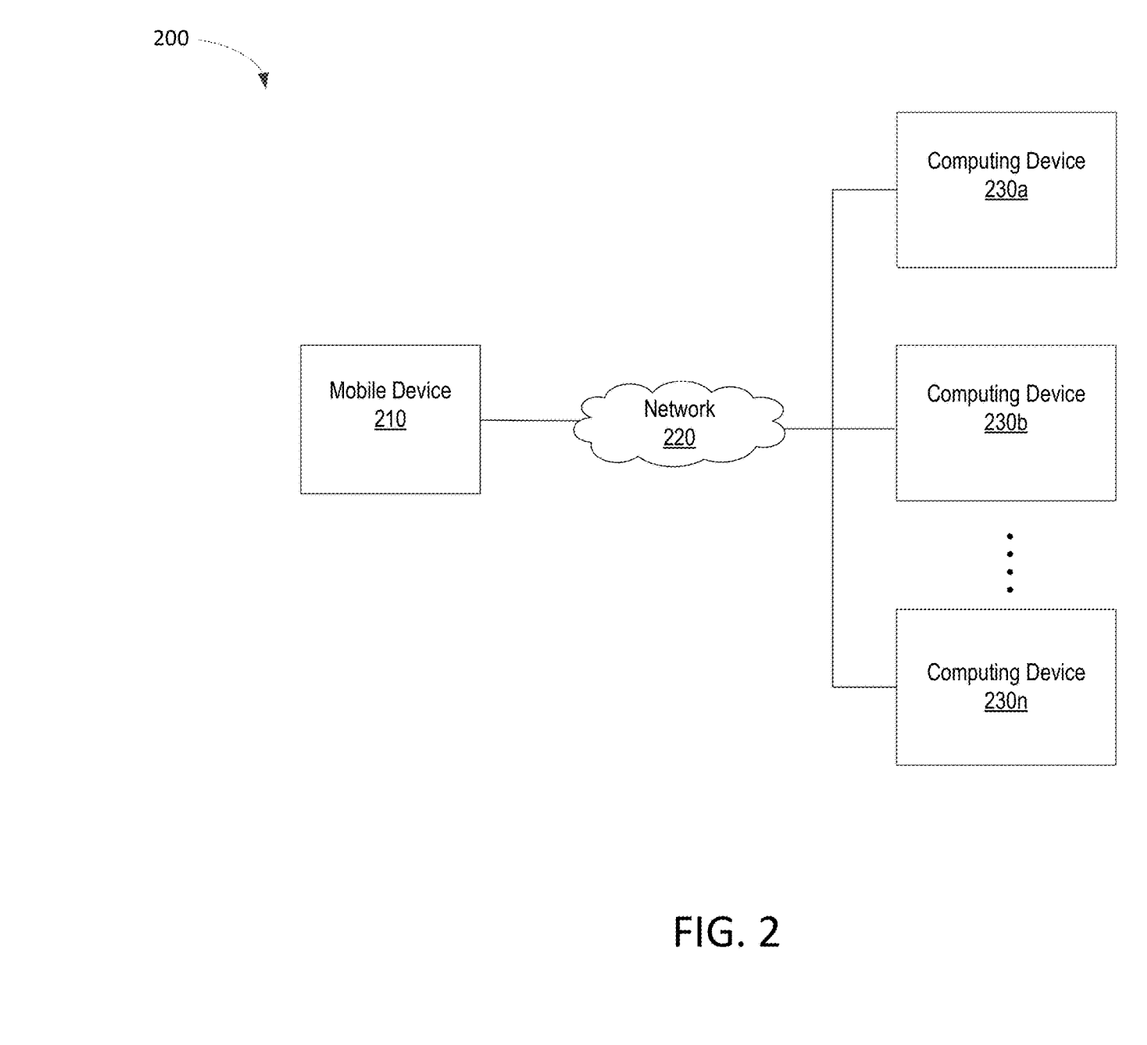
FIG. 2 illustrates a block diagram of an example computing network system.

FIG. 2 illustrates a block diagram of an example computing network system 200. The computing network system 200 may include one or more computing devices 230a-230n that may be capable of communicating digital messages with one another, either directly or via the network 220. The computing devices 230-230n may be user devices capable of logging into a session of an interactive computing environment and providing real-time interactive data via the network 220. The network 220 may include a wired and/or wireless network. For example, the network 220 may include a Wi-Fi communication network, a Wi-MAX communication network, a cellular communication network (e.g., CDMA, HSPA+, LTE, etc.), and/or a television white space (TVWS) communication network. The network 220 may include one or more communication networks.

The one or more computing devices 230a-230n may be capable of communicating digital messages to and/or receiving digital messages from the computing device 210 via the network 220. The computing device 210 may be a server, such as a web server, for providing a user interface to the computing devices 230a-230n. The computing device 210 may be in communication with an application executing locally on the computing devices 230a-230n for providing a user interface at the computing devices. The display of information may be generated locally at the computing devices 230a-230n or at the computing device 210 and provided via an application (e.g., a web browser) at the computing devices 230a-230n.

One or more of the computing devices 230a-230n may be operated by an administrative user capable of configuring sessions of an interactive computing environment that may be stored at the computing device 210. The computing device operated by the administrative user may submit credentials to the computing device 210 to allow the session to be configured. The session may be accessed by the computing devices 230a-230n via the network 220.

Figure 3:
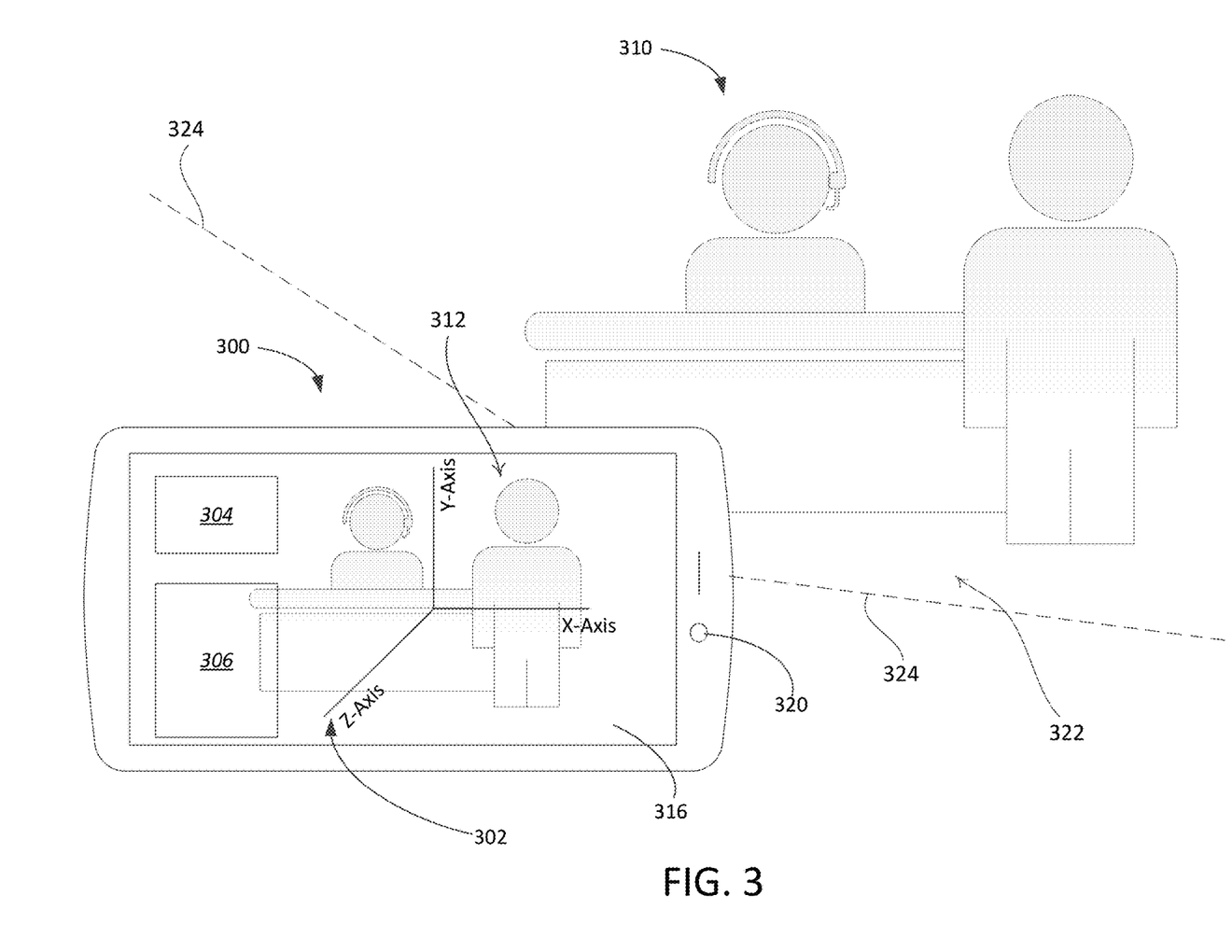
FIG. 3 illustrates an example mobile device overlaying information over an image captured by the mobile device in augmented reality.

FIG. 3 depicts an example mobile device 300 overlaying information over an image 312 captured by the mobile device 300 in augmented reality (AR). The mobile device 300 may be a camera-enabled mobile device. The mobile device 300 may implement an AR service (e.g., an augmented reality application) so that a user of the mobile device 300 can overlay information over one or more images/video 312 that are captured by one or more cameras (e.g., such as camera(s) 120) of the mobile device 300. As the user points the mobile device's camera at one or more objects in one or more scenes 310, the mobile device 300 may display the image of the one or more objects with the information overlaid. The overlaid information may be interactive such that the user can identify additional information or specific types of information, such as information that will aid the user in making a decision regarding the overlaid information.

The mobile device 300 may capture an image 312 of a scene 310 within a field of view 322 of the mobile device 300. The scene 310 may include one or more objects within the field of view 322 of the mobile device 300. The field of view 322 may be bounded by view boundaries 324. The view boundaries 324 may define a perimeter of the viewable area through the camera of the mobile device 300. The view boundaries 324 may extend outward from a camera located on the opposite side of the mobile device 300 as the display 316. Although the view boundaries 324 are shown as lines in FIG. 3, it should be appreciated that the view boundaries 324 extend 360 degrees through the lines in planes parallel to the rear surface of the mobile device 300. The display 316 of the mobile device 300 may display the image 312 captured by the mobile device 300. The display 316 may be configured to display a live image (e.g., video) received by the camera(s) of the mobile device 300. The mobile device 300 may overlay a plot 302, a first information field 304, and/or a second information field 306 over the image 312. For example, the plot 302, the first information field 304, and/or the second information field 306 may be presented to the user in front of the image 312 of the scene 310. The first information field 304 may display a first plurality of parameters (e.g., non-adjustable parameters) associated with the plot 302, the view boundaries 324, and/or data received by the mobile device 300. The first plurality of parameters may be associated with the view boundaries 324 and/or a first subset of data received by the mobile device 300. The second information field 306 may display a second plurality of parameters (e.g., user-adjustable parameters) associated with the plot 302. The second plurality of parameters may be associated with the view boundaries 324 and/or a second subset of the data received by the mobile device 300.

When the mobile device 300 (e.g., a camera) is pointed at the scene 310, the scene 310 may be displayed via the display 316 with information (e.g., such as the plot 302, the first information field 304, and/or the second information field 306) overlaid. As the user moves (e.g., translates, rotates, pivots, etc.) the mobile device 300, one or more objects of the scene 310 may change position and/or size in the image 312. The information may remain overlaid in front of the image 312 as the mobile device is moved. The plot 302, the first information field 304, and/or the second information field 306 may be selectable and/or adjustable. The user may use any suitable control mechanism of the mobile device 300 to select the plot 302, the first information field 304, and/or the second information field 306. For example, the user may touch the display 316 near the plot 302, the first information field 304, and/or the second information field 306 to select and/or adjust that overlaid information.

The plot 302, the first information field 304, and/or the second information field 306 may be adjusted by the user. For example, the user may enter data, adjust data, and/or select one or more options in the first information field 304 and/or the second information field 306. The plot 302 may update as the first information field 304 and/or the second information field 306 are adjusted. Additionally or alternatively, the user may adjust the plot 302 by touching the display 316 proximate to the plot 302. For example, the user may touch and drag the plot 302 to rotate the view, change display options of the plot, and/or activate additional plot features (e.g., such as trend lines, heat maps, etc.). Additionally or alternatively, the user may adjust the plot 302 using gesture motion, voice control, eye control, and/or the like. When gesture and/or eye control are used to adjust the plot 302, the first information field 304, and/or the second information field 306, a camera 320 located on the display side of the mobile device 300 may capture the gesture(s) and/or eye movement(s) of the user.

Although the first information field 304 and the second information field 306 are displayed on a left side of the display 316, it should be appreciated that the first information field and the second information field 306 may be arranged in other locations on the display 316. For example, the first and second information fields 304, 306 may be arranged on the right side, top, or bottom of the display 316. The first and second information fields 304, 306 may also be arranged in different parts of the display 316. For example, the first information field 304 may be arranged on the left side of the display 316 and the second information field 306 may be arranged on the right side, top, or bottom of the display 316. Although the mobile device 300 is depicted as a smart phone in FIG. 3, it should be appreciated that the mobile device 300 may be any other type of mobile device such as a tablet, an augmented reality headset, augmented reality glasses, a virtual reality headset, smart glasses, etc.

Figure 4:
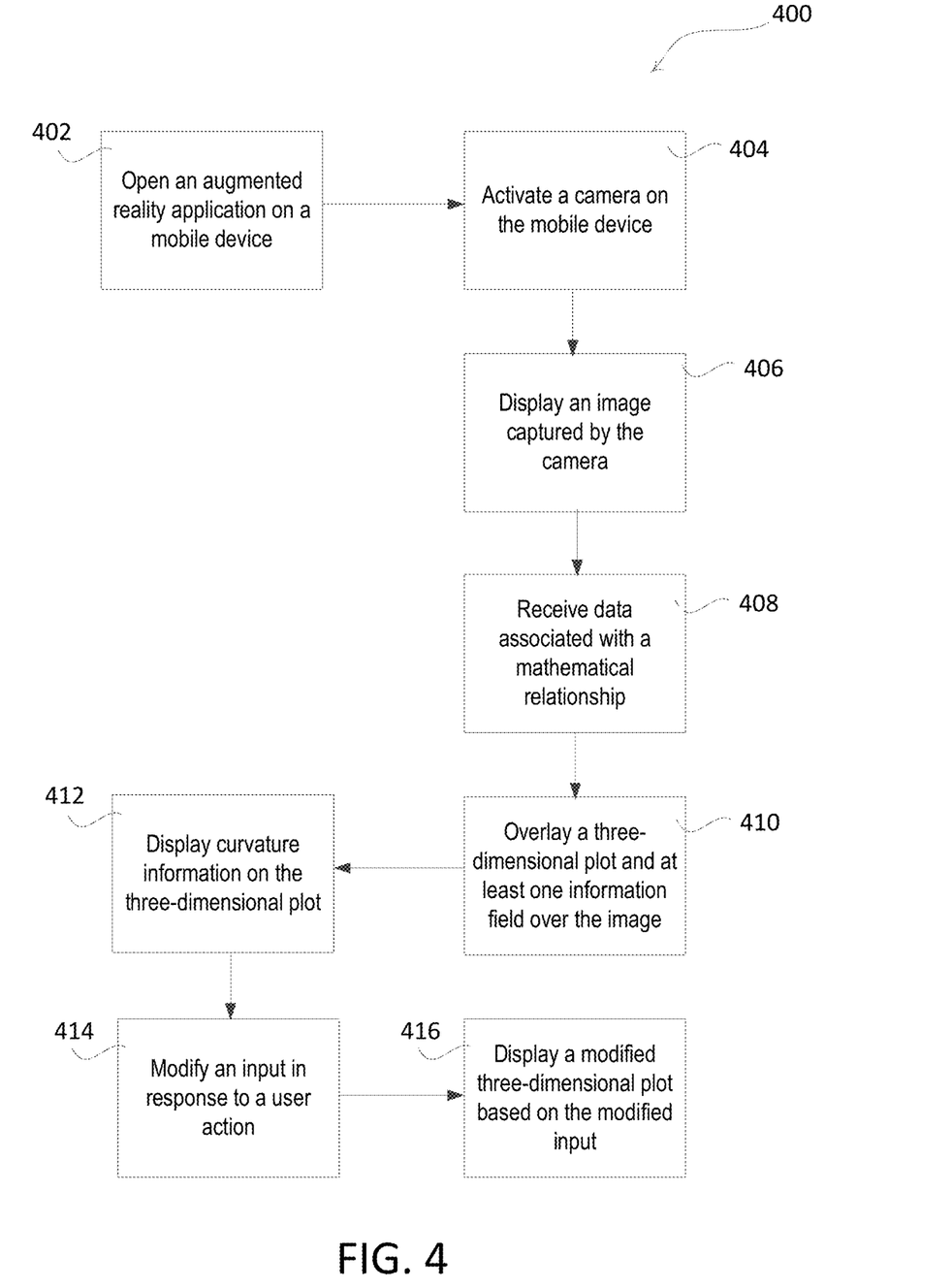
FIG. 4 is a flow diagram illustrating an example method that may be implemented to enable interaction with information that is overlaid over a captured image in augmented reality.

FIG. 4 is a flow diagram of an example method that may be implemented by a mobile device (e.g., such as the mobile device 100 shown in FIG. 1, the mobile device 210 shown in FIG. 2, and/or the mobile device 300 shown in FIG. 3) to enable interaction with information that is overlaid over a captured image (e.g., such as the image 312 shown in FIG. 3) in augmented reality. The method 400, or portions thereof, may be performed to enable augmented reality display of information. The augmented reality display of information may include a price surface or a volatility surface of an option, manipulation of a three-dimensional plot, examine a patient by adjusting data overlaid over the patient, a three-dimensional representation of a house with overlaid information, temperature analysis of a three-dimensional object, etc. The method 400, or portions thereof, may be performed by a single mobile device or may be distributed across multiple computing devices (e.g., a server and the mobile device). The method 400, or portions thereof, may be performed to enable users to interact with the image and/or the overlaid information to make decisions. The method 400, or portions thereof, may improve the functionality of a computer network system (e.g., such as the computing network system 200 shown in FIG. 2) associated with the augmented reality display of information. In addition, the method 400, or portions thereof, implement a distributed network architecture, as shown in FIG. 2, to reduce the amount of signaling between the mobile device and an administrative computing device (e.g., such as the computing device 210 shown in FIG. 2) and reduce the amount of processing resources consumed by the administrative computing device.

As illustrated in FIG. 4, a computing device may open, at 402, an augmented reality application on the mobile device. For example, the user of the mobile device may select the augmented reality application. The augmented reality application may be opened and/or executed from the memory of the mobile device (e.g., such as memory 106 shown in FIG. 1). The augmented reality application may be represented by an icon on a screen of the mobile device.

The mobile device may activate, at 404, a camera of the mobile device. For example, the augmented reality application may activate, at 404, the camera upon being executed. The mobile device may display, at 406, an image captured by the camera. The image may be displayed, at 406, on a display of the mobile device. The image may include a scene within a field of view of the mobile device. The scene may include one or more objects within the field of view of the mobile device.

The mobile device may receive, at 408, data (e.g., real-time data) associated with a mathematical relationship between a plurality of parameters. For example, the plurality of parameters and/or the mathematical relationship may be received and/or derived via the received data. The plurality of parameters may include inputs, constants, and/or outputs of the mathematical relationship. The mathematical relationship may be associated with a price surface or a volatility surface of an option, manipulation of a three-dimensional plot, examine a patient by adjusting data overlaid over the patient, a three-dimensional representation of a house with overlaid information, temperature analysis of a three-dimensional object, etc. For example, the mobile device may receive, at 408, one or more of the plurality of parameters. The data may be received, at 408, in real-time. For example, the data may be updated in real-time.

The mobile device may overlay, at 410, a three-dimensional plot and at least one information field (e.g., such as the first information field 304 and/or the second information field 306) over the image. For example, the mobile device (e.g., the augmented reality application) may determine the three-dimensional plot from the data received at 408. The three-dimensional plot may represent the mathematical relationship. For example, the three-dimensional plot may simulate the mathematical relationship over time. A numerical simulation algorithm may be selected, based on one or more mathematical properties of a problem, to solve for solutions to a model/mathematical relationship characterized by a set of equations. The numerical simulation algorithm may include but are not limited to: a closed form/analytic method, a lattice method, a Monte Carlo method, a mesh-based method (such as the finite element method and the finite difference method), a mesh-free method, etc. The at least one information field may display one or more of the plurality of parameters.

The mobile device may display, at 412, curvature information on the three-dimensional plot. The curvature information may map the mean curvature of the surface/mesh to a color spectrum. The curvature information may be displayed as a continuous color plot across the surface/mesh. The curvature information may enable the user to more easily identify and select areas of the surface that are changing more rapidly than other areas. The mobile device may determine the curvature information based on the mathematical relationship and the plurality of parameters. For example, the curvature information may be calculated using a vector function, the positions of points on the mesh surface and/or normals of points on the mesh surface, a first derivative, and/or a second derivative. The curvature information may be updated in real-time, for example, as the data is received at 408.

The mobile device may be configured to modify, at 414, one or more inputs of the plurality of parameters in response to a user action. The at least one information field may enable modification of one or more of the plurality of inputs. For example, the at least one information field may display text fields, sliders, selection controls, and/or the like. A text field may enable data entry, for example, to modify a value of the associated input. A slider may enable dragging an indicator between a minimum value and a maximum value. Selection controls may include a plurality of buttons that enable selection of a characteristic. When a use touches the screen proximate to a button, the characteristic associated with that button may be enabled. The mobile device may update the curvature information based on the modification to the one or more inputs.

The mobile device may display, at 416, a modified three-dimensional plot based on the modified input. For example, the mobile device may update the display of the three-dimensional plot as inputs are modified. The mobile device may also be configured to update the three-dimensional plot as additional data is received. For example, the three-dimensional plot may be updated in real-time.

Figure 5:
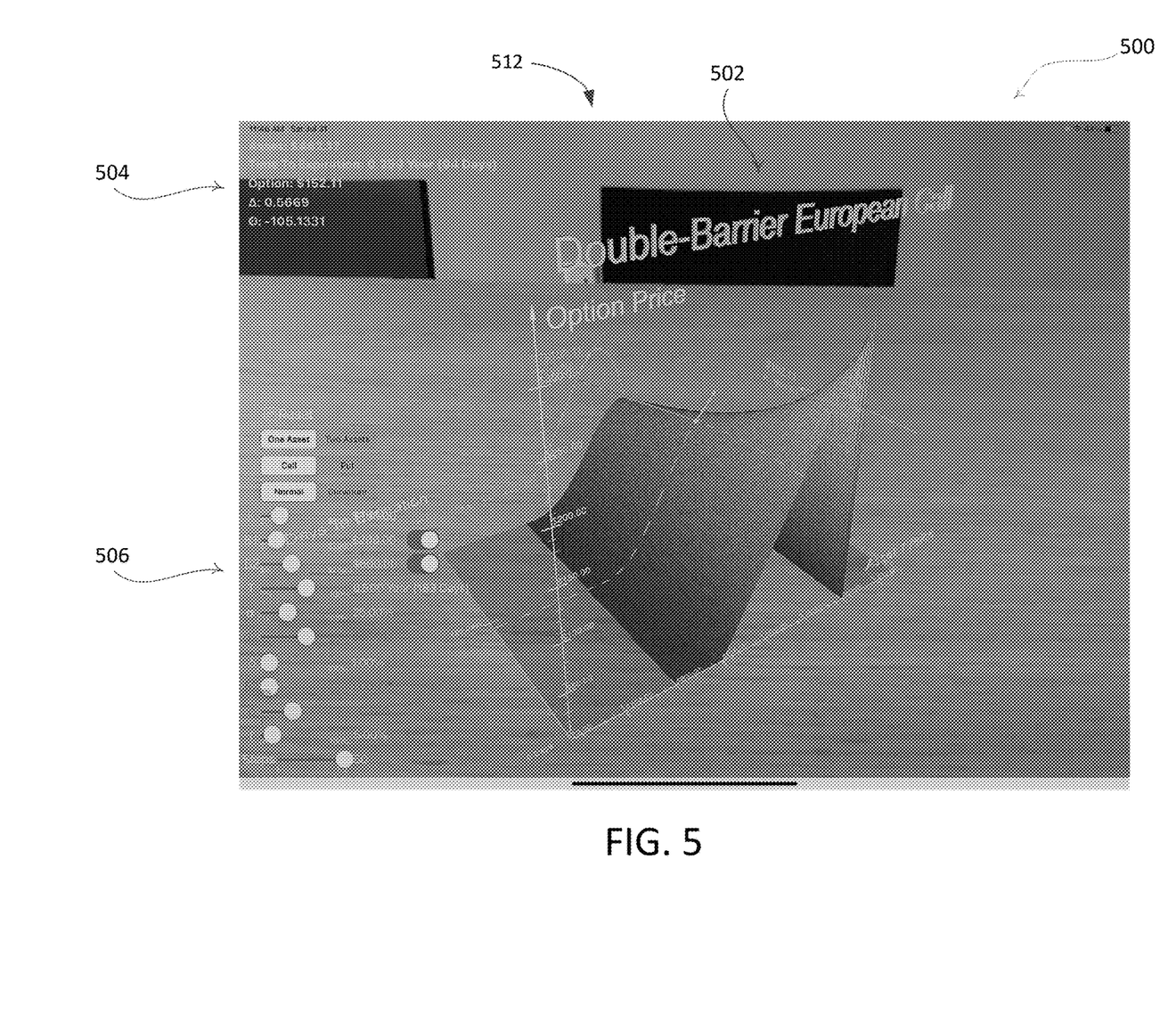
FIG. 5 illustrates an example display implementing augmented reality to enable interaction with information that is overlaid over a captured image.

FIG. 5 is an example display 500 of a mobile device (e.g., such as the mobile device 100 shown in FIG. 1, the mobile device 210 shown in FIG. 2, and/or the mobile device 300 shown in FIG. 3) that is implementing augmented reality to enable interaction with information that is overlaid over a captured image 512. The display 500 of the mobile device may display the image 512 captured by the mobile device.

The display 500 may be configured to display a live image (e.g., video) received by the camera(s) of the mobile device. A plot 502, a first information field 504, and/or a second information field 506 overlaid in front of the image 512. For example, the plot 502, the first information field 504, and/or the second information field 506 may be presented to the user in front of the image 512.

The plot 502, the first information field 504, and/or the second information field 506 may be selectable and/or adjustable. The user may use any suitable control mechanism of the mobile device to select the plot 502, the first information field 504, and/or the second information field 506. For example, the user may touch the display 500 near the plot 502, the first information field 504, and/or the second information field 506 to select and/or adjust that overlaid information.

The plot 502, the first information field 504, and/or the second information field 506 may be adjusted by the user. For example, the user may enter data, adjust data, and/or select one or more options in the first information field 504 and/or the second information field 506. The plot 502 may update as the first information field 504 and/or the second information field 506 are adjusted. Additionally or alternatively, the user may adjust the plot 502 by touching the display 500 proximate to the plot 502. For example, the user may touch and drag the plot 502 to rotate the view, change display options of the plot, and/or activate additional plot features (e.g., such as trend lines, heat maps, etc.). Additionally or alternatively, the user may adjust the plot 502 using gesture motion, voice control, eye control, and/or the like. When gesture and/or eye control are used to adjust the plot 502, the first information field 504, and/or the second information field 506, a camera located on the display side of the mobile device may capture the gesture(s) and/or eye movement(s) of the user.

The plot 502 may represent a price surface of an option (e.g., such as a double-barrier European Call). In this case, the plot 502 may be simulated using a one asset Black-Scholes equation. The one asset Black-Scholes equation may be represented as Equation (1).

$$\frac{\partial V}{\partial t} + \frac{1}{2}\sigma^2 S^2 \frac{\partial^2 V}{\partial S^2} + (r-\delta)S\frac{\partial V}{\partial S} - rV = 0 \qquad (1)$$

Where K is the strike price of the option, $B_1$ is the lower knock-out barrier price, $B_2$ is the upper knock-out barrier price, T is the expiration time, $\sigma$ is the volatility of the underlying asset, $\delta$ is the dividend yield of the underlying asset, r is the risk-free interest rate, S is the price of the underlying asset, V is the price of the option, and t is time.

A simulation algorithm may be used to solve Equation (1). The price of the option V may be the output of the simulation algorithm. For example, the plot 502 may be representation of the price of the option V vs. the price of the underlying asset S and the option's time to expiration T−t. The price of the underlying asset S may be a range of simulation input values that are determined (e.g., automatically determined) by K, $B_1$ and $B_2$. The time t may range from 0 to the expiration time T Steps may represent the number of timesteps to be taken in the simulation. The number of timesteps is user adjustable. Increasing the number of timesteps may increase the accuracy and/or stability of the simulation results.

Equation (1) may include a plurality of user-adjustable parameters and a plurality of non-adjustable parameters. The user-adjustable parameters may include the strike price of the option K, the lower knock-out barrier price $B_1$, the upper knock-out barrier price $B_2$, the expiration time T, the volatility of the underlying asset $\sigma$, the dividend yield of the underlying asset $\delta$, the risk-free interest rate r, and/or the number of timesteps to be taken in the simulation. The user-adjustable parameters may be displayed in the second information field 506. The user may modify one or more of the user-adjustable parameters by interacting with the second information field 506 and/or the plot 502. The non-adjustable parameters may include the price of the option V, the price of the underlying asset S, and the option's time to expiration T–t. The non-adjustable parameters may be displayed in the first information field 504. The first information field may also display rate of change information associated with a selected point on the plot 502. For example, the rate of change information may be associated with the real-time data at the selected point. The rate of change information may include the rate of change/derivative, $\Delta$, of the option's price with respect to the option's underlying asset's price and the rate of change/derivative, $\Theta$, of the option's price with respect to the option's time to expiration. The rate of change information may be displayed on the plot 502.

The initial condition of Equation (1) may include the payoff of the call/put option at the option's expiration date. The boundary conditions of Equation (1) may be based on put-call parity. If barrier(s) are present, the boundary conditions at the barrier(s) be zero.

The simulation algorithm may include a closed form analytic method, a Monte Carlo method, a lattice method, a finite difference method, a finite element method, etc. The simulation algorithm may be a pricing algorithm. For example, in the case of the finite element method, the Galerkin method of weighted residuals may be used to obtain the system of equations to be solved at each timestep with the implicit Euler scheme. For example, the simulation algorithm may convert Equation (1) to a discretized problem by applying linear constraints determined by finite sets of basis functions. The system of equations may be solved on the mobile device's graphics processing unit (GPU) for every timestep, for example, to accelerate the simulation process. For example, the system of equations may be solved using compute shader(s). Compute shader(s) may comprise a routine compiled for high throughput accelerators (such as GPUs, digital signal processors (DSPs), and/or field-programmable gate arrays (FPGAs)), separate from but used by a main program (e.g., such as the augmented reality application).

The geometric topology of the simulated price surface/mesh shown in plot 502 may be stored (e.g., in memory such as memory 106 shown in FIG. 1) using a quadtree, for example, to enable fast real-time data retrieval when the user interacts with the price surface (e.g., the plot 502).

Figure 6:
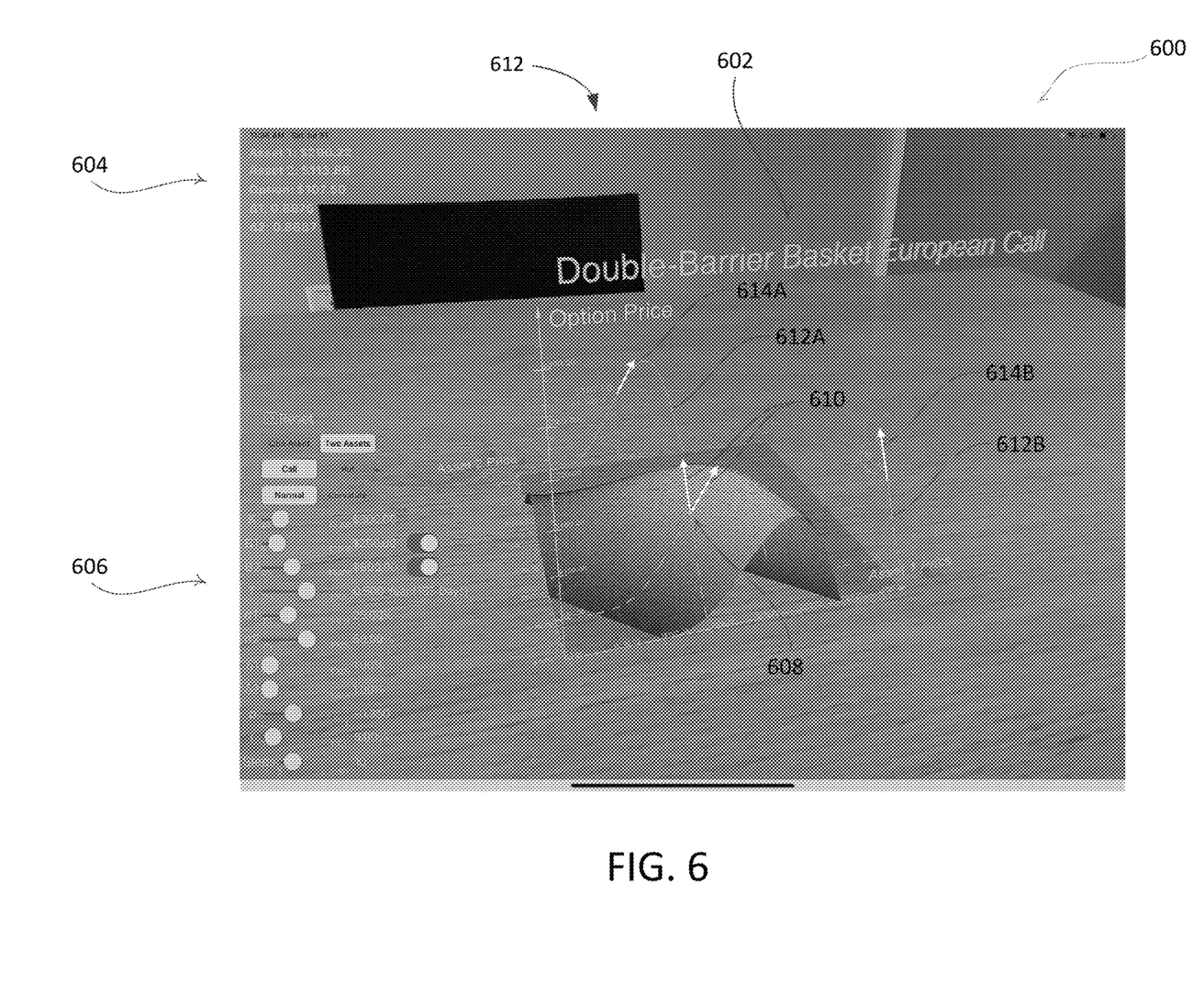
FIG. 6 illustrates another example display implementing augmented reality to enable interaction with information that is overlaid over a captured image.

FIG. 6 is another example display 600 of a mobile device (e.g., such as the mobile device 100 shown in FIG. 1, the mobile device 210 shown in FIG. 2, and/or the mobile device 300 shown in FIG. 3) that is implementing augmented reality to enable interaction with information that is overlaid over a captured image 612. The display 600 of the mobile device may display the image 612 captured by the mobile device. The display 600 may be configured to display a live image (e.g., video) received by the camera(s) of the mobile device. A plot 602, a first information field 604, and/or a second information field 606 overlaid in front of the image 612. For example, the plot 602, the first information field 604, and/or the second information field 606 may be presented to the user in front of the image 612.

The plot 602, the first information field 604, and/or the second information field 606 may be selectable and/or adjustable. The user may use any suitable control mechanism of the mobile device to select the plot 602, the first information field 604, and/or the second information field 606. For example, the user may touch the display 600 near the plot 602, the first information field 604, and/or the second information field 606 to select and/or adjust that overlaid information.

The plot 602, the first information field 604, and/or the second information field 606 may be adjusted by the user. For example, the user may enter data, adjust data, and/or select one or more options in the first information field 604 and/or the second information field 606. The plot 602 may update as the first information field 604 and/or the second information field 606 are adjusted. Additionally or alternatively, the user may adjust the plot 602 by touching the display 600 proximate to the plot 602. For example, the user may touch and drag the plot 602 to rotate the view, change display options of the plot, and/or activate additional plot features (e.g., such as trend lines, heat maps, etc.). Additionally or alternatively, the user may adjust the plot 602 using gesture motion, voice control, eye control, and/or the like. When gesture and/or eye control are used to adjust the plot 602, the first information field 604, and/or the second information field 606, a camera located on the display side of the mobile device may capture the gesture(s) and/or eye movement(s) of the user.

The plot 602 may represent a price surface of an option (e.g., such as a Double-Barrier Basket European Call). In this case, the plot 602 may be simulated using a two asset Black-Scholes equation. The two asset Black-Scholes equation may be represented as Equation (2).

$$\frac{\partial V}{\partial t} + \frac{1}{2}\sigma_1^2 S_1^2 \frac{\partial^2 V}{\partial S_1^2} + (r-\delta_1)S_1 \frac{\partial V}{\partial S_1} - rV + \qquad (2)$$

$$\frac{1}{2}\sigma_2^2 S_2^2 \frac{\partial^2 V}{\partial S_2^2} + (r-\delta_2)S_2 \frac{\partial V}{\partial S_2} + \rho\sigma_1\sigma_2 S_1 S_2 \frac{\partial^2 V}{\partial S_1 \partial S_2} = 0$$

Where K is the strike price of the option, $B_1$ is the lower knock-out barrier price, $B_2$ is the upper knock-out barrier price, T is the expiration time, $\sigma_1$ is the volatility of the first underlying asset, $\sigma_2$ is the volatility of the second underlying asset, $\delta_1$ is the dividend yield of the first underlying asset, $\delta_2$ is the dividend yield of the second underlying asset, $\rho$ is the correlation coefficient between the first underlying asset and the second underlying asset, r is the risk-free interest rate, $S_1$ is the price of the first underlying asset, $S_2$ is the price of the second underlying asset, V is the price of the option, and t is time.

A simulation algorithm may be used to solve Equation (2). The price of the option V may be the output of the simulation algorithm. For example, the plot 602 may be representation of the price of the option V vs. the price of the first underlying asset price $S_1$ and the second underlying asset price $S_2$. The price of the first and second underlying assets $S_1$ and $S_2$ may be a range of simulation input values that are determined (e.g., automatically determined) by K, $B_1$ and $B_2$. The time t may range from 0 to the expiration time T Steps may represent the number of timesteps to be taken in the simulation. The number of timesteps is user adjustable.

Increasing the number of timesteps may increase the accuracy and/or stability of the simulation results.

Equation (2) may include a plurality of user-adjustable parameters and a plurality of non-adjustable parameters. The user-adjustable parameters may include the strike price of the option K, the lower knock-out barrier price $B_1$, the upper knock-out barrier price $B_2$, the expiration time T, the volatility of the first underlying asset $\sigma_1$, the volatility of the second underlying asset $\sigma_2$, the dividend yield of the first underlying asset $\delta_1$, the dividend yield of the second underlying asset $\delta_2$, the correlation coefficient $\rho$ between the first underlying asset and the second underlying asset, the risk-free interest rate r, and/or the number of timesteps to be taken in the simulation. The user-adjustable parameters may be displayed in the second information field 606. The user may modify one or more of the user-adjustable parameters by interacting with the second information field 606 and/or the plot 602. The non-adjustable parameters may include the price of the option V, the price of the first underlying asset $S_1$, the price of the second underlying asset $S_2$, and the option's time to expiration T−t. The non-adjustable parameters may be displayed in the first information field 604. The first information field may also display rate of change information associated with a selected point on the plot 602. The rate of change information may include the rate of change/derivative, $\Delta_1$, of the option's price with respect to the first underlying asset's price and the rate of change/derivative, $\Delta_2$, of the option's price with respect to the second underlying asset's price. The rate of change information may be displayed on the plot 602.

The plot 602 may include a point 608 on the three-dimensional plot. The point 608 may be user-selected and/or auto selected. The plot 602 may include a plurality of first vectors 610 extending from the point 608. The plurality of first vectors 610 may indicate the rate of change information. For example, a vector of the first vectors 610 may indicate the rate of change/derivative, $\Delta_1$, of the option's price with respect to the first underlying asset's price at the point 608 and another vector of the first vectors 610 may indicate the rate of change/derivative, $\Delta_2$, of the option's price with respect to the second underlying asset's price at the point 608.

The plot 602 may include a first two-dimensional plot 612A and a second two-dimensional plot 612B associated with the point 608. For example, the first two-dimensional plot 612A and the second two-dimensional plot 612B may be two-dimensional projections of the three-dimensional plot at the point 608. The first two-dimensional plot 612A may represent the first underlying asset price vs. the option price at the second underlying asset price associated with the point 608. The second two-dimensional plot 612B may represent the second underlying asset price vs. the option price at the first underlying asset price associated with the point 608. The first two-dimensional plot 612A may include a second vector 614A extending from the first two-dimensional plot 612A at a point that corresponds to the point 608. The second vector 614A may define the rate of change on the first two-dimensional plot 612A at the point that corresponds to the point 608. For example, the second vector 614A may indicate the rate of change/derivative, $\Delta_1$, of the option's price with respect to the first underlying asset's price at the point 608. The second two-dimensional plot 612B may include a third vector 614B extending from the second two-dimensional plot 612B at a point that corresponds to the point 608. The third vector 614B may define the rate of change on the second two-dimensional plot 612B at the point that corresponds to the point 608. For example, the third vector 614B may indicate the rate of change/derivative, $\Delta_2$, of the option's price with respect to the second underlying asset's price at the point 608. The second vector 614A and the third vector 614B may correspond to the plurality of first vectors 610 extending from the point 608. The plurality of first vectors 610 may indicate the rate of change information. For example, a vector of the first vectors 610 may indicate the rate of change/derivative, $\Delta_1$, of the option's price with respect to the first underlying asset's price at the point 608 and another vector of the first vectors 610 may indicate the rate of change/derivative, $\Delta_2$, of the option's price with respect to the second underlying asset's price. The mobile device may update the first information field 604 to display vector information associated with the plurality of vectors 610. The point 608 and the plurality of first vectors 610 may be moved to a different place on the plot 602, for example, in response to a user action. The first information field 604 may update based on the point 608 and the plurality of vectors 610 being moved on the plot 602.

The initial condition of Equation (2) may include the payoff of the call/put option at the option's expiration date. The boundary conditions of Equation (2) may be based on put-call parity. If barrier(s) are present, the boundary conditions at the barrier(s) be zero.

The simulation algorithm may include a closed form analytic method, a Monte Carlo method, a lattice method, a finite difference method, a finite element method, etc. For example, in the case of the finite element method, the Galerkin method of weighted residuals may be used to obtain the system of equations to be solved at each timestep with the implicit Euler scheme. For example, the simulation algorithm may convert Equation (2) to a discrete problem by applying linear constraints determined by finite sets of basis functions. The system of equations may be solved on the mobile device's graphics processing unit (GPU) for every timestep, for example, to accelerate the simulation process. For example, the system of equations may be solved using compute shader(s). Compute shader(s) may comprise a routine compiled for high throughput accelerators (such as GPUs, digital signal processors (DSPs), and/or field-programmable gate arrays (FPGAs)), separate from but used by a main program (e.g., such as the augmented reality application).

The geometric topology of the simulated price surface/mesh shown in plot 602 may be stored (e.g., in memory such as memory 106 shown in FIG. 1) using a quadtree, for example, to enable fast real-time data retrieval when the user interacts with the price surface (e.g., the plot 602).

Figure 7:
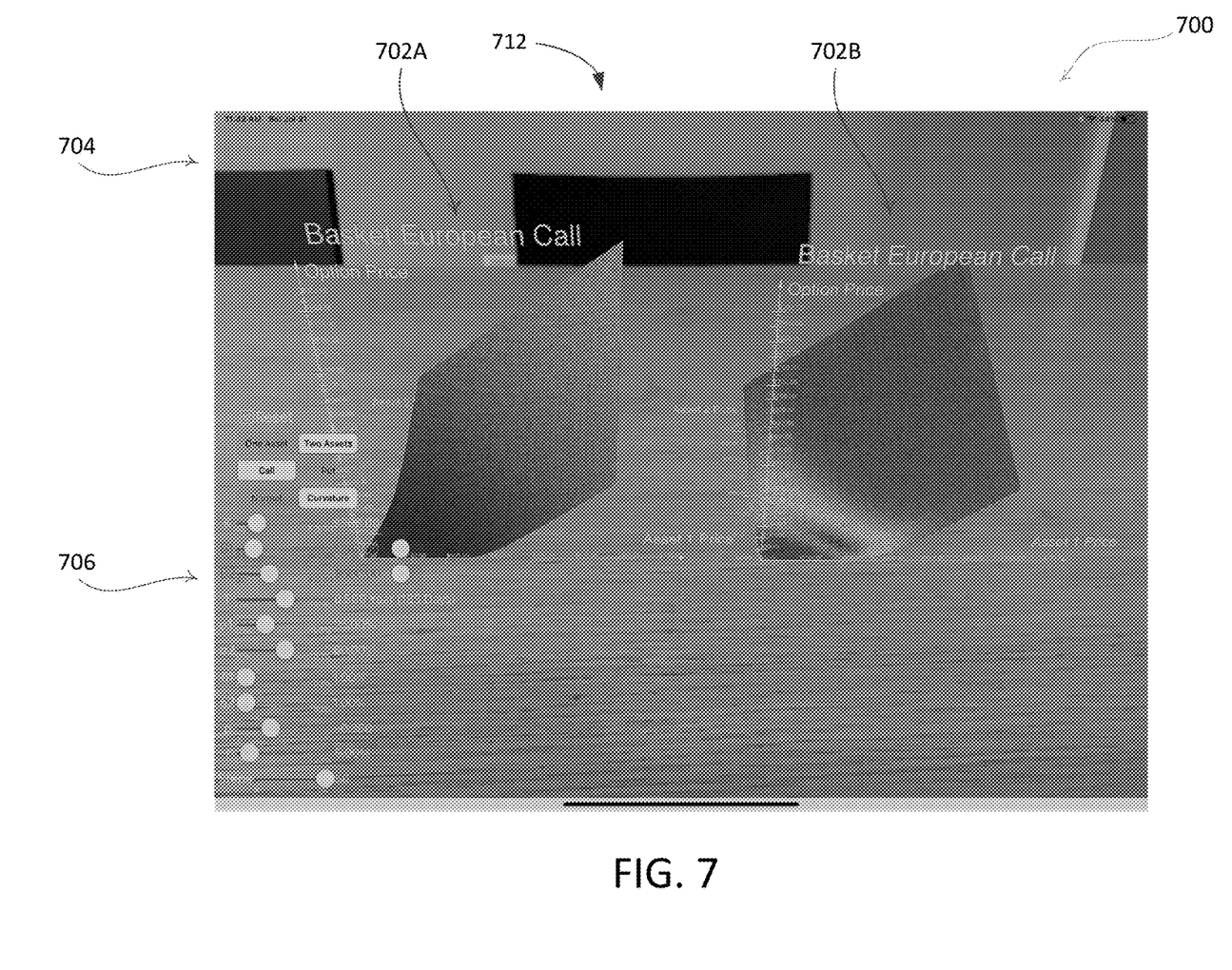
FIG. 7 illustrates another example display implementing augmented reality to enable interaction with information that is overlaid over a captured image.

FIG. 7 is another example display 700 of a mobile device (e.g., such as the mobile device 100 shown in FIG. 1, the mobile device 210 shown in FIG. 2, and/or the mobile device 300 shown in FIG. 3) that is implementing augmented reality to enable interaction with information that is overlaid over a captured image 712. The display 700 of the mobile device may display the image 712 captured by the mobile device. The display 700 may be configured to display a live image (e.g., video) received by the camera(s) of the mobile device. A first plot 702A, a second plot 702B, a first information field 704, and/or a second information field 706 may be overlaid in front of the image 712. For example, the first plot 702A, the second plot 702B, the first information field 704, and/or the second information field 706 may be presented to the user in front of the image 712.

The mobile device (e.g., the augmented reality application) may enable the user to select from a plurality of visualization modes. The visualization modes may include a normal mode, a curvature mode, etc. The normal mode may map the price value at each point on the price surface/mesh to a color spectrum. The curvature mode may map the price surface/mesh's mean curvature at each point to a color spectrum. The first plot 702A may display a price surface/mesh in the normal mode. The second plot 702B may display the price surface/mesh in the curvature mode. Although FIG. 7 depicts both the normal mode and the curvature mode (e.g., via the first plot 702A and the second plot 702B), it should be appreciated that the mobile device may display either the normal mode or the curvature mode.

It should be appreciated that although plots 502, 602, 702A, 702B represent price surfaces as shown in FIGS. 5-7, the plots 502, 602, 702A, 702B may represent other relationships having three dimensions, for example such as a three-dimensional model of a medical patient, a three-dimensional representation of a house, temperature analysis of a three-dimensional object, etc. For example, the augmented reality application disclosed herein may enable a doctor to examine the contour of a patient's chest by dragging on the 3D geometrical representation of the patient in augmented reality, where the color of the 3D body surface may represent body temperature, for example. In another example, the augmented reality application disclosed herein may enable a real estate agent to examine the dimensions of a house by dragging on the 3D geometrical representation of a house in augmented reality. In another example, the augmented reality application disclosed herein may enable a mechanical engineer to examine the surface details and contour of parts of an engine by dragging on the 3D CAD model in augmented reality where the color of the surface represents stress or temperature of the engine, for example.

Although features and elements are described herein in particular combinations, each feature or element can be used alone or in any combination with the other features and elements.

What is claimed is:

1. A mobile device for providing an augmented reality display of a scene, comprising:
    a camera for capturing a scene comprising one or more objects;
    a display for displaying an image or video of the scene;
    a processor; and
    a memory, the processor configured to:
        display an image of the scene on the display;
        receive real-time data associated with a mathematical relationship between a plurality of parameters;
        overlay a three-dimensional plot and an information field over the displayed image, the three-dimensional plot representing the mathematical relationship of the real-time data, the information field configured to display and enable modification of one or more of the plurality of parameters;
        determine curvature information associated with the three-dimensional plot;
        display the curvature information on the three-dimensional plot;
        modify an input of the plurality of parameters in response to a user action, update the curvature information based on the modification to the input;
        display a modified three-dimensional plot using the updated curvature information and the modified input;
        in response to selection of a point on the three-dimensional plot, display a plurality of vectors extending from the point and update the information field to display vector information associated with the plurality of vectors.

2. The mobile device of claim 1, wherein the three-dimensional plot is derived using a Black-Scholes equation.

3. The mobile device of claim 1, wherein the three-dimensional plot comprises a surface mesh with a heat map indicating mean curvature information.

4. The mobile device of claim 1, wherein the processor is further configured to change a visualization mode of the three-dimensional plot from a first visualization mode to a second visualization mode.

5. The mobile device of claim 4, wherein the first visualization mode comprises a normal mode in which a value at each point on the three-dimensional plot is mapped to a color spectrum, and wherein the second visualization mode comprises a curvature mode in which a mean curvature at each point on the three-dimensional plot is mapped to the color spectrum.

6. The mobile device of claim 1, wherein the plurality of vectors indicate rate of change information for the real-time data at the selected point.

7. The mobile device of claim 1, wherein the curvature information indicates rate of change information for the real-time data.

8. The mobile device of claim 1, wherein the processor is further configured to display one or more two-dimensional plots that represent projections of the three-dimensional plot at the selected point.

9. The mobile device of claim 8, wherein each of the one or more two-dimensional plots comprise a vector that corresponds to one of the plurality of vectors.

10. A method of providing an augmented reality display of a scene, the method comprising:
    capturing a scene comprising one or more objects;
    displaying an image of the scene on the display;
    receiving real-time data associated with a mathematical relationship between a plurality of parameters;
    overlaying a three-dimensional plot and an information field over the displayed image, the three-dimensional plot representing the mathematical relationship of the real-time data, the information field configured to display and enable modification of one or more of the plurality of parameters;
    determining curvature information associated with the three-dimensional plot;
    displaying the curvature information on the three-dimensional plot;
    modifying an input of the plurality of parameters in response to a user action, update the curvature information based on the modification to the input;
    displaying a modified three-dimensional plot using the updated curvature information and the modified input;
    in response to selection of a point on the three-dimensional plot, displaying a plurality of vectors extending from the point and update the information field to display vector information associated with the plurality of vectors.

11. The method of claim 10, wherein the three-dimensional plot is derived using a Black-Scholes equation.

12. The method of claim 10, wherein the three-dimensional plot comprises a surface mesh with a heat map indicating mean curvature information.

13. The method of claim 10, further comprising changing a visualization mode of the three-dimensional plot from a first visualization mode to a second visualization mode.

14. The method of claim 13, wherein the first visualization mode comprises a normal mode in which a value at each point on the three-dimensional plot is mapped to a color spectrum, and wherein the second visualization mode comprises a curvature mode in which a mean curvature at each point on the three-dimensional plot is mapped to the color spectrum.

15. The method of claim 10, wherein the plurality of vectors indicate rate of change information for the real-time data at the selected point.

16. The method of claim 10, wherein the curvature information indicates rate of change information for the real-time data.

17. The method of claim 10, further comprising displaying one or more two-dimensional plots that represent projections of the three-dimensional plot at the selected point.

18. The mobile device of claim 17, wherein each of the one or more two-dimensional plots comprise a vector that corresponds to one of the plurality of vectors.

* * * * *